(12) United States Patent
Ren

(10) Patent No.: US 8,350,890 B2
(45) Date of Patent: Jan. 8, 2013

(54) METHOD AND APPARATUS OF WIRELESS VIDEO TRANSCEIVING BASED ON MULTI-CARRIER TECHNIQUE

(75) Inventor: Jun Ren, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1223 days.

(21) Appl. No.: 11/944,178

(22) Filed: Nov. 21, 2007

(65) Prior Publication Data
US 2008/0122921 A1 May 29, 2008

(30) Foreign Application Priority Data

Nov. 24, 2006 (CN) .......................... 2006 1 0146792

(51) Int. Cl.
*H04N 7/14* (2006.01)
(52) U.S. Cl. .................................. 348/14.08; 348/14.12
(58) Field of Classification Search .... 348/14.01–14.04, 348/14.05–14.12, 14.13–14.16; 375/E7.001, 375/E7.211; 379/201.01, 202.01; 370/260–271
See application file for complete search history.

(56) References Cited

U.S. PATENT DOCUMENTS

| | | | | |
|---|---|---|---|---|
| 5,995,491 | A * | 11/1999 | Richter et al. | 370/263 |
| 6,992,692 | B2 * | 1/2006 | Gu et al. | 348/14.12 |
| 2005/0231588 | A1 * | 10/2005 | Yang et al. | 348/14.08 |

FOREIGN PATENT DOCUMENTS

| | | |
|---|---|---|
| CN | 1277517 A | 12/2000 |
| CN | 1784006 A | 6/2006 |
| JP | 2004032712 A | 1/2004 |
| JP | 2006237692 A | 9/2006 |

\* cited by examiner

*Primary Examiner* — Brian Ensey
(74) *Attorney, Agent, or Firm* — Patterson Thuente Christensen Pedersen, P.A.

(57) ABSTRACT

The present invention discloses a method and an apparatus of wireless video transceiving based on a multi-carrier technique. The method comprises the following steps: image information in a video GOP are separated and a sequential relationship between individual image information is recorded; general image information and important image information are treated discriminatingly in a video transmission process according to the degree of importance of different image information, in order to improve a transmission quality of the important image information; after the image information is received by a receiving end, the image information is recombined into the video GOP according to the sequential relationship. In the present invention, the important image information and non-important image information are treated discriminatingly via a sub-carrier allocation and a selection of different transmitting conditions in order to enhance the transmission quality of important image information in terms of improving the transmitting condition, so that the transmission quality of the wireless video is guaranteed.

10 Claims, 6 Drawing Sheets

METHOD AND APPARATUS OF WIRELESS VIDEO TRANSCEIVING BASED ON MULTI-CARRIER TECHNIQUE

RELATED APPLICATION

The present application claims priority to Chinese Application No. 200610146792.9 filed Nov. 24, 2006, which is incorporated herein in its entirety by reference.

BACKGROUND OF THE INVENTION

1. Field of Invention

The present invention relates to a wireless video transceiving technique, especially to a method and an apparatus of wireless video transceiving based on a multi-carrier technique.

2. Description of Prior Art

The conventional video communication generally concerns processes as follows: a video signal is compressed into a video stream, and the video stream is transmitted directly to a wired or wireless communication channel, i.e., via a series of intermediate processes such as source encoding, channel encoding, modulation, channel transmission, demodulation, channel decoding and source decoding etc., so that video transmission and reception are completed. According to the resource allocation method of a current wireless multimedia system (referring to Chinese patent 200510053159.0, with the Publication No. CN1829131), video and voice are transmitted in a sub-carrier allocation manner, but the video transmission is still based on the video stream. However, three different types of frames (I Frame, B Frame and P Frame) and related image header information are contained in the GOP (Group of Picture) of the video stream (referring to FIGS. 1 and 2). FIG. 3 is an coding structure diagram of GOP. As illustrated, the I frame is a start frame to which other frames refer, and the quality of the I frame directly effects the quality of the following frames in the same group. The P frame is a forward predict frame, which is formed by removing similar data with a previous frame based on a comparison with the image of the previous frame. The B frame is a bi-directional frame, which is obtained from a comparison with images of a previous and a next frame. The P frame and the B frame are both dependent on the I frame. Additionally, image header information is also important. The loss of a package containing image header information will directly cause an image associated with this information to not be decoded. In the conventional transmission method based on video stream, the above three types of frames are of different degrees of importance. These figures, and the related image header information, are all actually transmitted in the same manner and under the same channel condition, which is therefore unreasonable. Especially in a wireless channel, certain bit errors will be caused due to factors such as fading and various disturbances etc. If frames are transmitted as described above, once I frame errors occur, or the image header information is lost, the quality of video may be greatly reduced.

SUMMARY OF THE INVENTION

Accordingly, a main object of the present invention is to provide a method and an apparatus of wireless video transceiving based on a multi-carrier technique, in order to resolve a technical problem in the current video communication technique that in transmission process image information of different degrees of importance are unable to be processed discriminatively so that it is difficult to guarantee the quality of video transmission.

To resolve the object as described above, the present invention provides a method of wireless video transceiving based on a multi-carrier technique, which comprises the following steps:

at step 1, the image information in a video GOP is separated and a sequential relationship between individual image information is recorded;

at step 2, general image information and important image information are treated discriminatingly in a video transmission process according to the degree of importance of different image information, in order to improve a transmission quality of important image information;

at step 3, after the image information is received by a receiving end, the image information is recombined into the video GOP according to the sequential relationship.

In step 2 of the above method, important image information includes the I frame and image header information.

In the above method, general image information includes the B frame and the P frame.

In step 2 of the above method, sufficient sub-carriers are allocated to the I frame and image header information in order to guarantee corresponding frequency intervals between allocated sub-carriers, and a channel with better conditions is selected from wireless channels to be used for transmission.

In step 2 of the above method, under the precondition that the I frame and image header information is transmitted normally, sub-carriers are allocated to the B frame and the P frame.

In step 3 of the above method, the combination of GOP is performed according to a synchronization relationship between individual sub-carriers and the sequential relationship between image header information, and the I frame, the B frame, and the P frame.

To achieve the object as described above, the present invention further provides an apparatus of wireless video transceiving based on a multi-carrier technique, which comprises: a frame separation module for separating image information in a video GOP and for recording a sequential relationship between individual image information; a sub-carrier allocation module for treating general image information and important image information discriminatingly in a video transmission process according to the degree of importance of different image information so as to improve a transmission quality of important image information; and a frame synthesis and GOP combination module for recombining the image information into the video GOP according to the sequential relationship after the image information is received by a receiving end.

In the above apparatus, the important image information includes the I frame and image header information, and the general image information includes the B frame and the P frame.

In the above apparatus, the sub-carrier allocation module allocates sufficient sub-carriers for the I frame and the image header information in order to guarantee corresponding frequency intervals between allocated sub-carriers, and selects a channel with a better condition from wireless channels to be used for transmission, and allocates sub-carriers for the B frame and the P frame under the precondition that the I frame and image header information are transmitted normally.

In the frame synthesis and GOP combination module of the above apparatus, the combination of GOP is performed by frame synthesis and the GOP combination module according to a synchronization relationship between individual sub-carriers and the sequential relationship between the image header information and the I frame, the B frame, and the P frame.

The advantages of the present invention are as follows:

in the present invention, not only the importance of the I frame is analyzed, but also the importance of the video image header information is analyzed; there is provided in the present invention that the video image header information, the I frame, the B frame, and the P frame are extracted respectively to be indexed, sorted, transmitted, and combined; the important information and the non-important information are treated discriminatingly for the extracted different parts by means of a sub-carrier allocation and a selection of different transmitting conditions, so as to guarantee the transmission of important information in terms of improving the transmission condition, thereby the quality of the whole video stream is increased. Therefore, according to the present invention, transmission quality of wireless video may be guaranteed to the maximum extent.

DETAILED DESCRIPTION OF PREFERRED EMBODIMENTS

Figure 1:
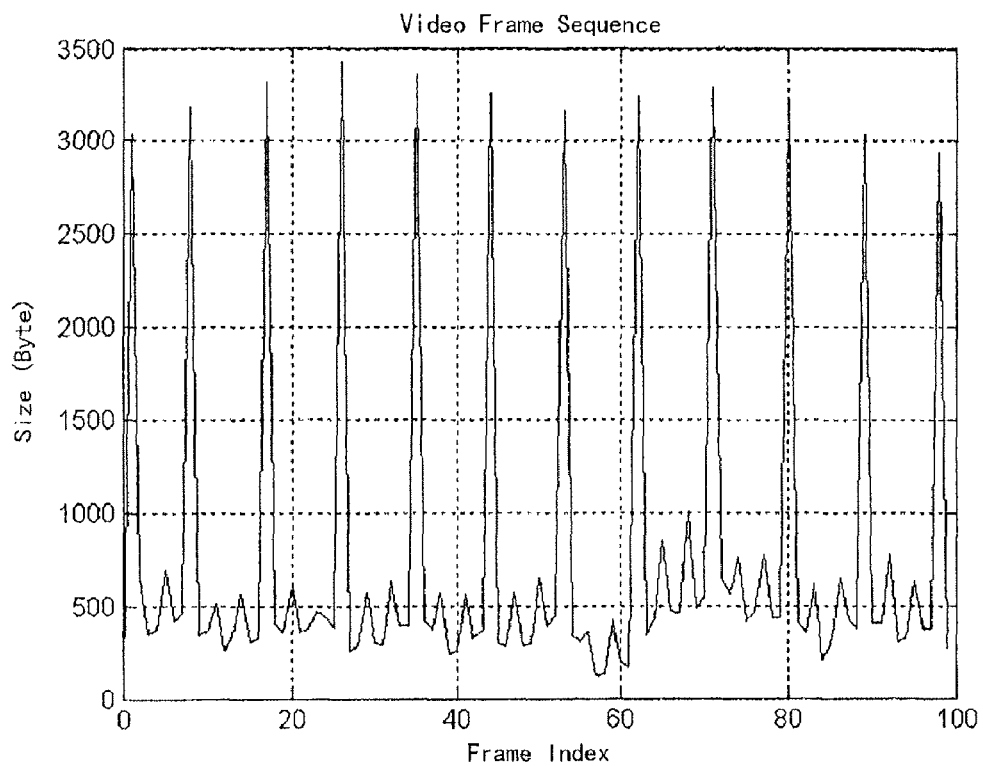
FIG. 1 is a frame sequence structure diagram of a video stream.
Figure 2:
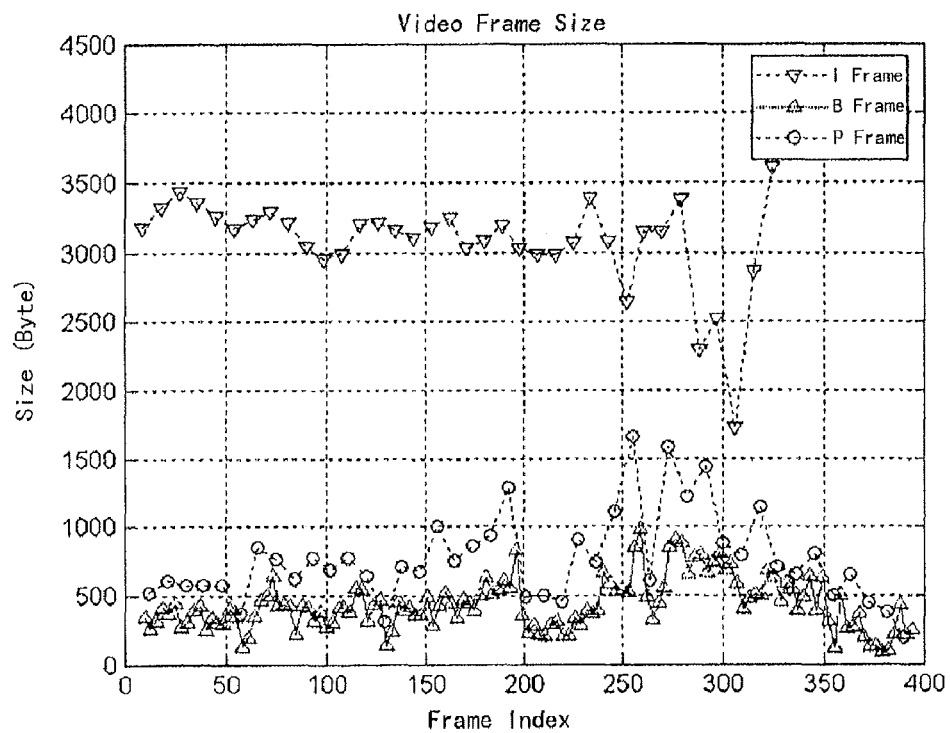
FIG. 2 is a frame size comparison diagram of a video stream.
Figure 3:
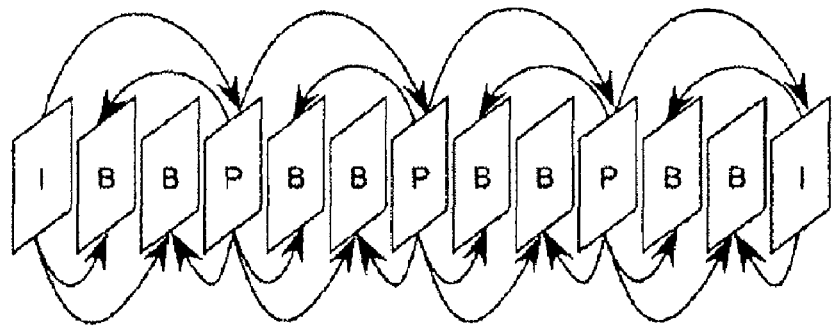
FIG. 3 is a coding structure diagram of GOP.
Figure 4:
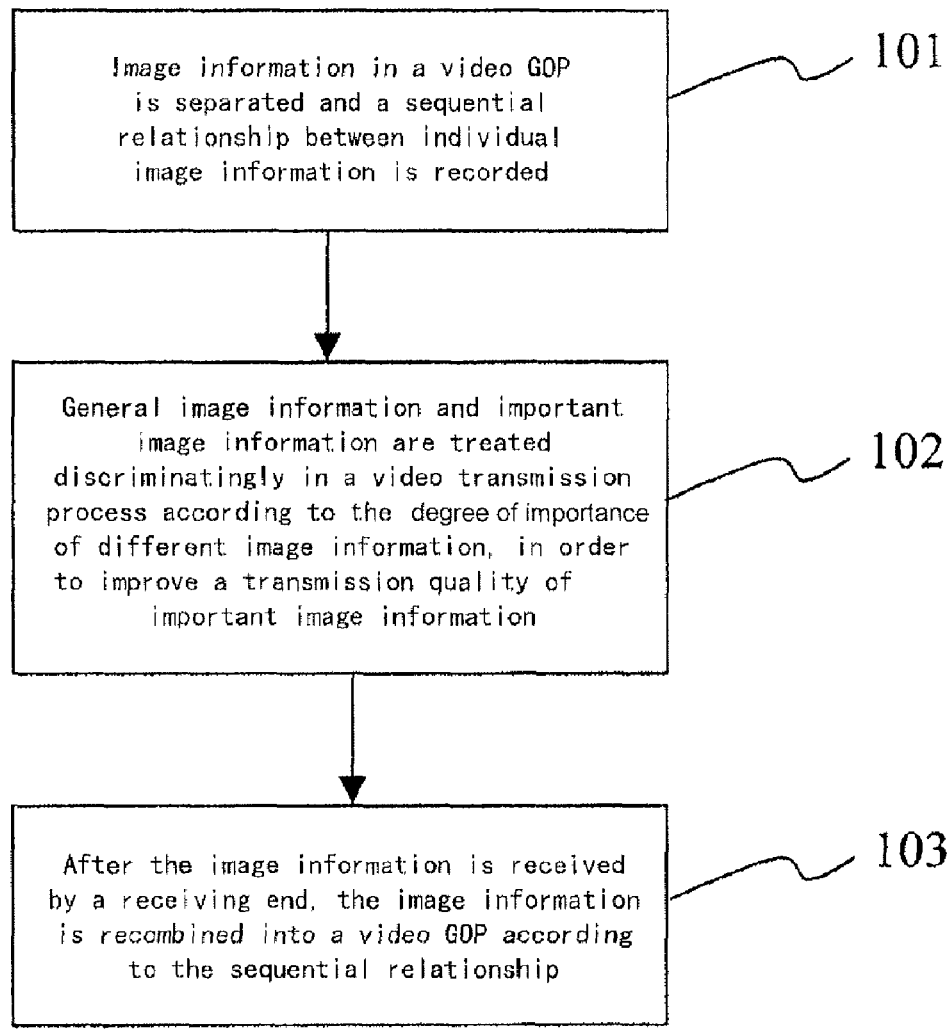
FIG. 4 is a flowchart according to the method of the present invention.

FIG. 4 is a flowchart according to the method of the present invention. As illustrated in FIG. 4, a wireless video transceiving method based on a multi-carrier technique according to the present invention mainly comprises the following steps:

at step 101, image information in a video GOP is separated and a sequential relationship between individual image information is recorded;

at step 102, general image information and important image information are treated discriminatingly in a video transmission process according to the degree of importance of different image information, in order to improve a transmission quality of important image information;

at step 103, after the image information is received by a receiving end, the image information is recombined into a video GOP according to the sequential relationship.

Figure 5:
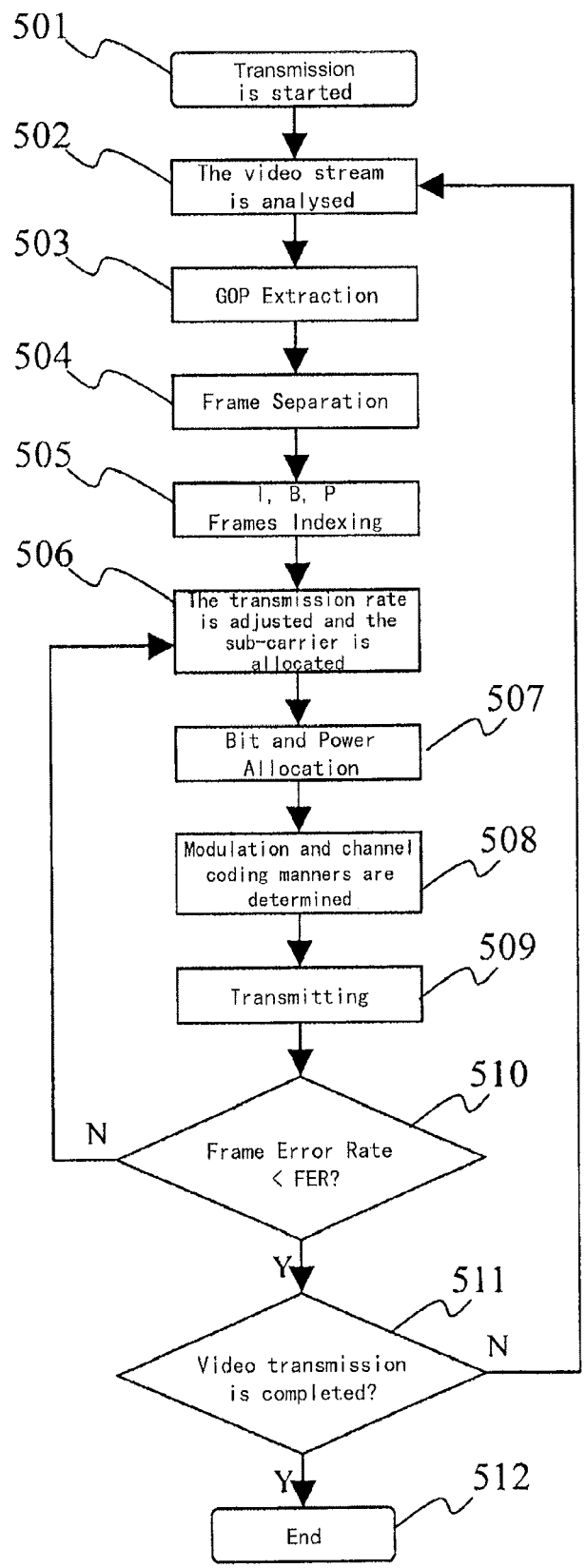
FIG. 5 is a flowchart on a video transmission side in detail according to the method of the present invention.

The process of video transmission and reception may be divided into a transmission side process and a reception side process according to the method of the present invention. FIG. 5 is a flowchart of the video transmission side according to the method of the present invention. As illustrated in FIG. 5, the transmission side process according to the present invention comprises the following steps:

at step 501, the process of the transmission side is started;

at step 502, the video stream is analyzed;

at step 503, GOP is extracted from the video stream;

at step 504, frame separation is performed on GOP, from which the image header information and the I, B, and P frames are separated;

at step 505, the I, B, and P frames are indexed;

at step 506, the transmission rate is adjusted, a matching transmission rate is determined based on the data amount of the image header information and the I, B, P frames; firstly, a minimal required amount of sub-carriers are allocated to the image header information and the I frame; and finally, a minimal required amount of sub-carriers are allocated to the B and P frames;

at step 507, bit allocation and power allocation are performed according to conventional multi-carrier transmission techniques;

at step 508, modulation and channel coding manners matching the channel condition are determined;

at step 509, the image information is transmitted;

at step 510, it is determined whether a transmitted FER is less than a FER (Frame Error Rate); if so, the process goes to step 511; otherwise the process returns to step 506;

at step 511, it is determined whether the video transmission is completed; if so, the process goes to step 512; otherwise the process returns to step 502;

at step 512, the transmission side process is ended.

Figure 6:
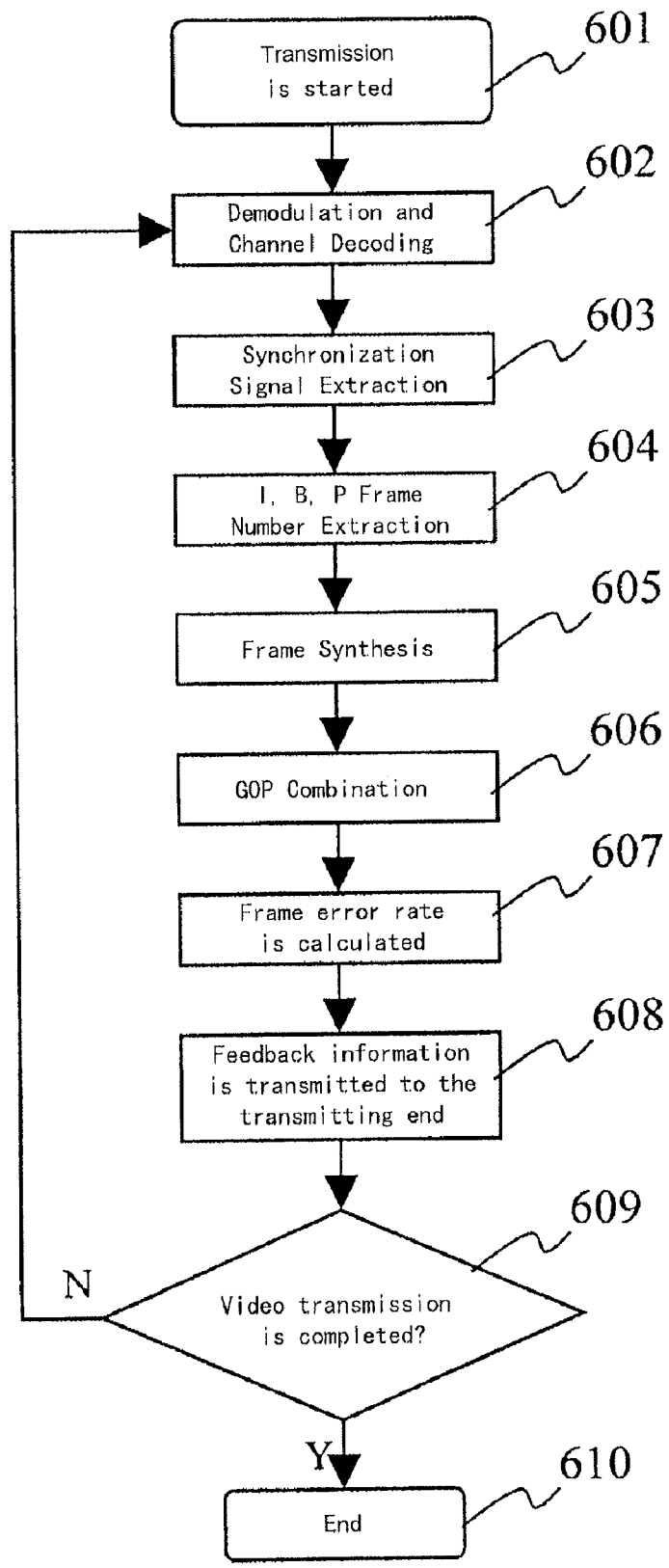
FIG. 6 is a flowchart on a video reception side in detail according to the method of the present invention.

FIG. 6 is a flowchart on a video reception side in detail according to the method of the present invention. As illustrated in FIG. 6, the reception side process according to the present invention comprises the following steps:

at step 601, the multi-carrier signals are received according to the conventional multi-carrier reception technique;

at step 602, demodulation and channel coding are performed;

at step 603, a synchronization signal is extracted;

at step 604, frame numbers of the I, B, and P frames are extracted;

at step 605, frame synthesis is performed according to the synchronization relationship between individual sub-carriers and the sequential order of the numbers for the image header information and the I frame, the B frame, and the P frame;

at step 606, GOP combination is performed according to the relationship between the image header information and the I, B, and P frames, and finally a video stream is formed on the receiving end;

at step 607, FER is calculated;

at step 608, a feedback information is transmitted to the transmitting end;

at step 609, it is determined whether the video transmission is completed; if so, the process goes to step 610; otherwise the process returns to step 602;

at step 610, the reception side process is ended.

Figure 7:
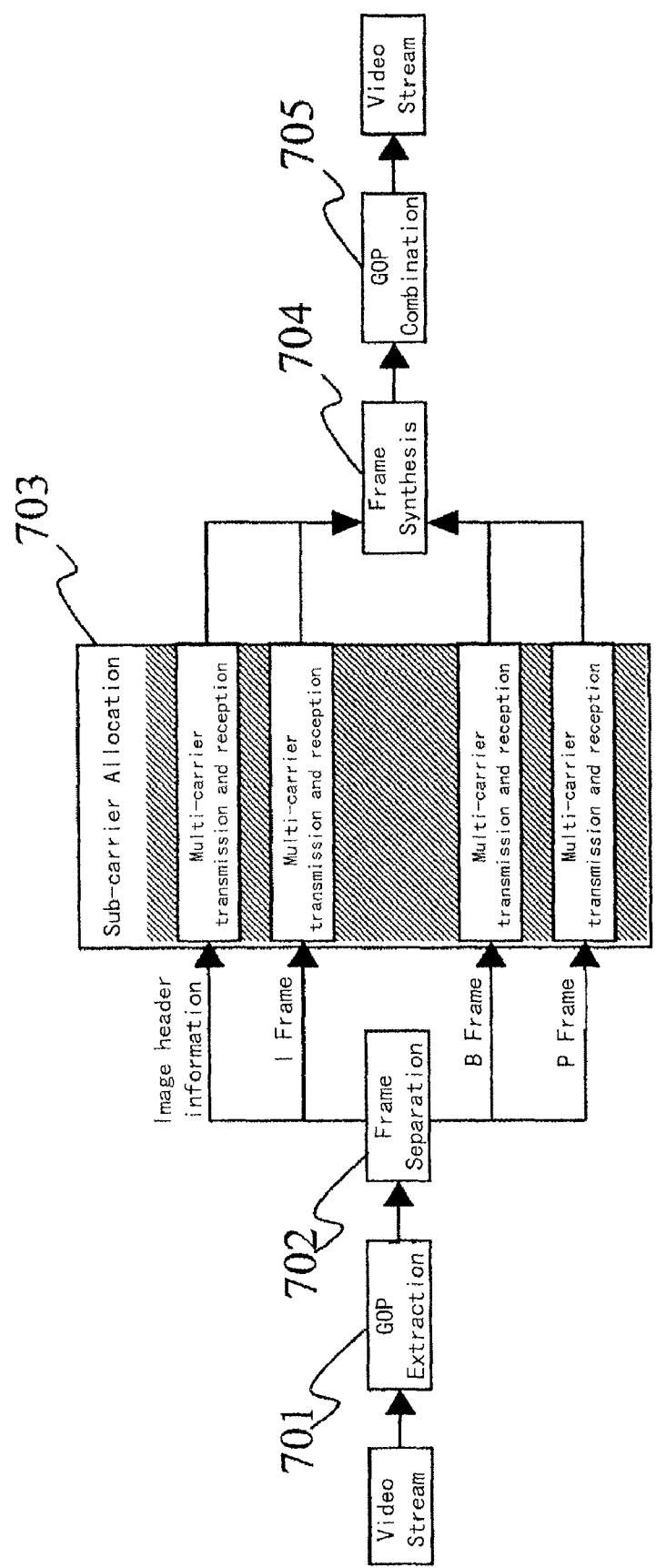
FIG. 7 is a structure diagram of a wireless video transceiving apparatus based on a multi-carrier technique according to the present invention.

FIG. 7 is a structure diagram of a wireless video transceiving apparatus based on a multi-carrier technique according to the present invention. As illustrated in FIG. 7, the apparatus according to the present invention mainly comprises:

a GOP extraction module 701 for extracting GOP from the video stream;

a frame separation module 702 for separating the image information in the video GOP and recording a sequential relationship between individual image information;

a sub-carrier allocation module 703 for treating discriminatingly to general image information and important image information in a video transmission process according to the degree of importance of different image information, in order to improve a transmission quality of important image information;

a frame synthesis module 704 for performing frame synthesis according to the synchronization relationship between individual sub-carriers and the sequential order of the numbers for the image header information and the I, B, and P frames;

a GOP synthesis module 705 for performing GOP combination according to the relationship between the image header information and the I, B, and P frames and finally forming a video stream on the receiving end.

As known from the above, the present invention has the following technical advantages:

1) during transmission, the I, B, and P frames and image header information are extracted from GOP respectively and separated; during reception, a sequential relationship between the I, B, and P frames and the image header information is extracted with a synchronization signal between sub-carriers, and GOP combination is performed on the receiving end.

2) more sub-carriers are allocated to the I frame and the image header information; certain frequency intervals between these sub-carriers are guaranteed; and a wireless channel with a better conditions is selected to be used for transmission;

3) less sub-carriers are allocated to the B frame and the P frame; in the case that the precondition for transmission of the I frame is satisfied, the transmission of the B frame and the P frame is completed.

4) video frames are transmitted discriminatingly according to their importance, which may guarantee either the integrity of data or a high-efficiency of transmission.

Figure 8:
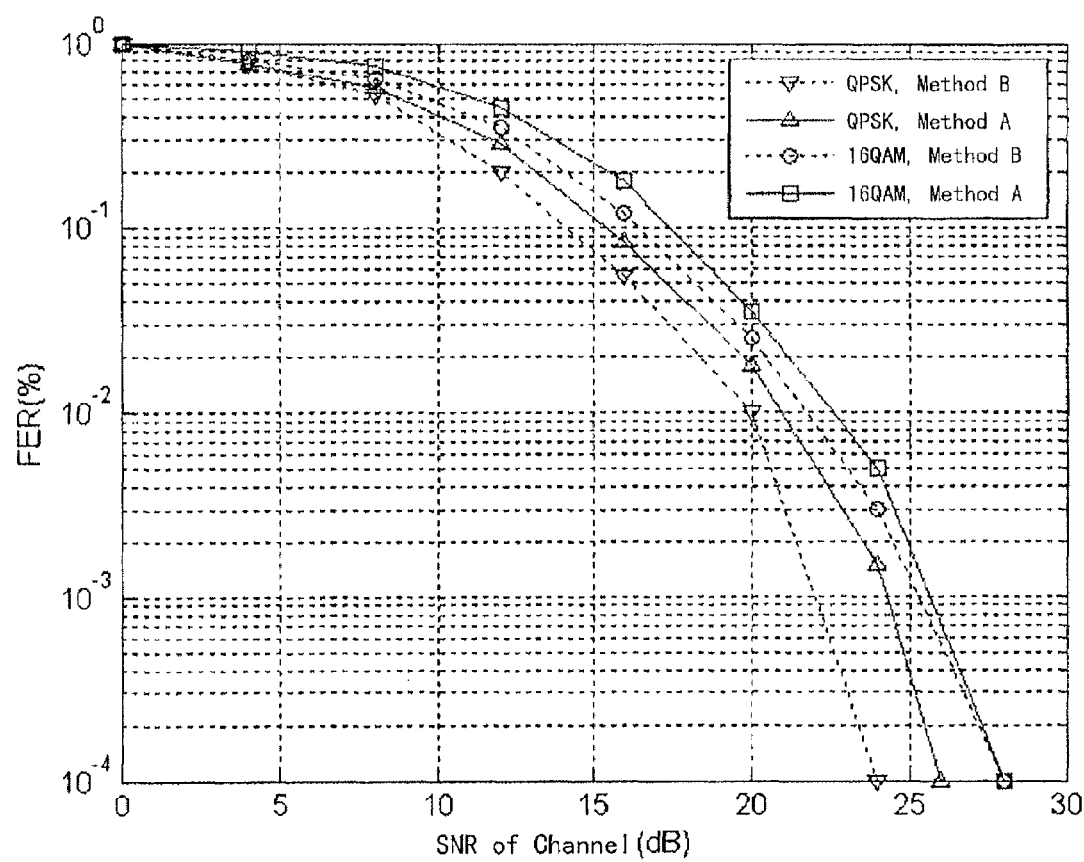
FIG. 8 is a comparison diagram of an experimental result according to the present invention.

FIG. 8 is a comparison diagram on an experimental result according to the present invention, wherein A refers to the conventional method and B refers to the method of the present invention. From the experiment result, whether QPSK (Quaternary Phase Shift Keying) or 16 QAM (16 Quadrature Amplitude Modulation) is employed, the method of the present invention is superior to the conventional method.

As discussed above, the present invention has the following technical effects: not only is the importance of the I frame analyzed, also the importance of video image header information is analyzed; there is provided in the present invention that video image header information, the I frame, the B frame and the P frame are extracted respectively to be indexed, sorted, transmitted, and combined; the important information and the non-important information are treated discriminatingly for the extracted different parts by means of a sub-carrier allocation and a selection of different transmission conditions, so as to increase the transmission quality of important information in terms of improving the transmission condition. Thereby transmission quality of wireless video may be guaranteed to the maximum extent.

The above is only the preferred embodiments of the present invention and the present invention is not limited to the above embodiments. Therefore, any modifications, substitutions and improvements to the present invention are possible without departing from the spirit and scope of the present invention.

What is claimed is:

1. A method of wireless video transceiving based on a multi-carrier technique, which comprises the following steps:
    at step 1, image information in a video GOP (Group of Picture) are separated and a sequential relationship between individual image information is recorded;
    at step 2, general image information and important image information are treated discriminatingly in a video transmission process according to the degree of importance of different image information, in order to improve a transmission quality of important image information, the important image information including an I frame and image header information, and the general image information including a B frame and a P frame;
    at step 3, after the image information is received by a receiving end, the image information is recombined into the video GOP according to the sequential relationship, wherein in said step 2,
    sufficient sub-carriers are allocated to the I frame and the image header information in order to guarantee corresponding frequency intervals between allocated sub-carriers, and a channel with better conditions is selected from wireless channels to be used for transmission.

2. The method according to claim 1, wherein in said step 2, under a precondition that the I frame and the image header information are transmitted normally, sub-carriers are allocated to the B frame and the P frame.

3. The method according to claim 1, wherein in said step 3, the combination of GOP is performed according to a synchronization relationship between individual sub-carriers and the sequential relationship between the image header information and the I frame, the B frame, and the P frame.

4. An apparatus of wireless video transceiving based on a multi-carrier technique, which comprises:
    a frame separation module for separating image information in a video GOP (Group of Picture) and for recording a sequential relationship between individual image information;
    a sub-carrier allocation module for treating general image information and important image information discriminatingly in a video transmission process according to degrees of importance of different image information so as to improve a transmission quality of important image information; and
    a frame synthesis and GOP combination module for recombining the image information into the video GOP according to the sequential relationship after the image information is received.

5. The apparatus according to claim 4, wherein the important image information includes the I frame and image header information, and the general image information includes the B frame and the P frame.

6. The apparatus according to claim 5, wherein the sub-carrier allocation module allocates sufficient sub-carriers for the I frame and the image header information in order to guarantee corresponding frequency intervals between allocated sub-carriers, and selects a channel with better conditions from wireless channels to be used for transmission; and allocates sub-carriers for the B frame and the P frame under the precondition that the I frame and the image header information are transmitted normally.

7. The apparatus according to claim 6, wherein the combination of GOP is performed by the frame synthesis and GOP combination module according to a synchronization relationship between individual sub-carriers and the sequential relationship between the image header information and the I frame, the B frame, and the P frame.

8. A method of wireless video transceiving based on a multi-carrier technique, which comprises the following steps:
    at step 1, image information in a video GOP (Group of Picture) are separated and a sequential relationship between individual image information is recorded;
    at step 2, general image information and important image information are treated discriminatingly in a video transmission process according to the degree of importance of different image information, in order to improve a transmission quality of important image information, the important image information including an I frame and image header information, and the general image information including a B frame and a P frame;

at step 3, after the image information is received by a receiving end, the image information is recombined into the video GOP according to the sequential relationship, wherein in said step 2, under a precondition that the I frame and the image header information are transmitted normally, sub-carriers are allocated to the B frame and the P frame.

9. The method according to claim 8, wherein in said step 2, sufficient sub-carriers are allocated to the I frame and the image header information in order to guarantee corresponding frequency intervals between allocated sub-carriers, and a channel with better conditions is selected from wireless channels to be used for transmission.

10. The method according to claim 8, wherein in said step 3, the combination of GOP is performed according to a synchronization relationship between individual sub-carriers and the sequential relationship between the image header information and the I frame, the B frame, and the P frame.

* * * * *